(12) United States Patent
Kothari et al.

(10) Patent No.: US 8,138,479 B2
(45) Date of Patent: Mar. 20, 2012

(54) INTEGRATED LIGHT EMITTING AND LIGHT DETECTING DEVICE

(75) Inventors: Manish Kothari, Cupertino, CA (US);
James Randolph Webster, San Jose, CA (US); Gaurav Sethi, Dublin, CA (US); Alok Govil, Santa Clara, CA (US); Jonathan Charles Griffiths, Fremont, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 120 days.

(21) Appl. No.: 12/559,085

(22) Filed: Sep. 14, 2009

(65) Prior Publication Data
US 2010/0187422 A1 Jul. 29, 2010

Related U.S. Application Data

(60) Provisional application No. 61/147,044, filed on Jan. 23, 2009.

(51) Int. Cl.
*G01J 1/42* (2006.01)
(52) U.S. Cl. ......................................................... 250/353
(58) Field of Classification Search ................... 250/353
See application file for complete search history.

(56) References Cited

U.S. PATENT DOCUMENTS

| | | | |
|---|---|---|---|
| 4,282,862 A | 8/1981 | Soleau | |
| 4,484,179 A * | 11/1984 | Kasday | 345/176 |
| 4,947,291 A | 8/1990 | McDermott | |
| 4,963,859 A * | 10/1990 | Parks | 345/176 |
| 5,422,683 A | 6/1995 | Tanigaki | |
| 5,506,929 A | 4/1996 | Tai et al. | |
| 5,544,268 A | 8/1996 | Bischel et al. | |
| 5,550,373 A | 8/1996 | Cole et al. | |
| 5,594,222 A | 1/1997 | Caldwell | |
| 5,777,589 A | 7/1998 | Gale et al. | |
| 6,021,007 A | 2/2000 | Murtha | |
| 6,040,937 A | 3/2000 | Miles | |

(Continued)

FOREIGN PATENT DOCUMENTS

EP 0 362 993 4/1990

(Continued)

OTHER PUBLICATIONS

International Search Report and Written Opinion dated Jan. 14, 2010 for PCT Application No. PCT/US2009/046941.

(Continued)

*Primary Examiner* — David Porta
*Assistant Examiner* — Marcus Taningco
(74) *Attorney, Agent, or Firm* — Knobbe, Martens, Olson & Bear LLP

(57) ABSTRACT

Methods and systems for providing a light device that can emit light and sense light are disclosed. In one embodiment, a lighting device includes a light guide having a planar first surface, the light guide configured such that at least some ambient light enters the light guide through the first surface and propagates therein, and at least one light detector disposed along an edge of the light guide, the at least one detector optically coupled to the light guide to receive light propagating therein. The light detector can be configured to produce a control signal. In some embodiments, the lighting device also includes at least one light turning feature disposed on the first surface, the at least one light turning feature configured to direct light incident into the light guide through the first surface.

30 Claims, 11 Drawing Sheets

U.S. PATENT DOCUMENTS

| | | | |
|---|---|---|---|
| 6,094,285 A | 7/2000 | Wickham et al. | |
| 6,123,431 A | 9/2000 | Teragaki et al. | |
| 6,172,667 B1* | 1/2001 | Sayag | 345/175 |
| 6,320,394 B1 | 11/2001 | Tartagni | |
| 6,335,831 B2 | 1/2002 | Kowarz et al. | |
| 6,369,947 B1 | 4/2002 | Staub et al. | |
| 6,392,368 B1 | 5/2002 | Deller et al. | |
| 6,402,325 B1 | 6/2002 | Yamamoto | |
| 6,421,103 B2 | 7/2002 | Yamaguchi | |
| 6,630,968 B1 | 10/2003 | Tsuchihashi et al. | |
| 6,674,562 B1 | 1/2004 | Miles | |
| 6,773,126 B1 | 8/2004 | Hatjasalo et al. | |
| 6,864,882 B2* | 3/2005 | Newton | 345/173 |
| 6,871,982 B2 | 3/2005 | Holman et al. | |
| 6,891,530 B2 | 5/2005 | Umemoto et al. | |
| 6,972,753 B1* | 12/2005 | Kimura et al. | 345/175 |
| 7,014,349 B2 | 3/2006 | Shinohara et al. | |
| 7,042,444 B2* | 5/2006 | Cok | 345/173 |
| 7,072,096 B2 | 7/2006 | Holman et al. | |
| 7,123,216 B1 | 10/2006 | Miles | |
| 7,210,806 B2 | 5/2007 | Holman et al. | |
| 7,327,510 B2 | 2/2008 | Cummings et al. | |
| 7,360,939 B2 | 4/2008 | Sugiura | |
| 7,400,439 B2 | 7/2008 | Holman et al. | |
| 7,520,642 B2 | 4/2009 | Holman et al. | |
| 7,573,631 B1 | 8/2009 | Amm | |
| 7,656,391 B2* | 2/2010 | Kimura et al. | 345/173 |
| 2002/0024711 A1 | 2/2002 | Miles | |
| 2003/0026536 A1 | 2/2003 | Ho | |
| 2003/0128538 A1 | 7/2003 | Shinohara et al. | |
| 2003/0160919 A1 | 8/2003 | Suzuki et al. | |
| 2003/0169385 A1 | 9/2003 | Okuwaki | |
| 2004/0228109 A1 | 11/2004 | Leu et al. | |
| 2005/0002175 A1 | 1/2005 | Matsui et al. | |
| 2005/0117190 A1 | 6/2005 | Iwauchi et al. | |
| 2005/0133761 A1 | 6/2005 | Thielemans | |
| 2006/0024017 A1 | 2/2006 | Page et al. | |
| 2006/0066541 A1 | 3/2006 | Gally et al. | |
| 2006/0066783 A1 | 3/2006 | Sampsell | |
| 2006/0180886 A1 | 8/2006 | Tsang | |
| 2006/0262562 A1 | 11/2006 | Fukasawa et al. | |
| 2006/0265919 A1 | 11/2006 | Huang | |
| 2006/0279558 A1 | 12/2006 | Van Delden et al. | |
| 2006/0290683 A1 | 12/2006 | Pasquariello et al. | |
| 2007/0034783 A1* | 2/2007 | Eliasson et al. | 250/221 |
| 2007/0125937 A1 | 6/2007 | Eliasson et al. | |
| 2007/0171418 A1 | 7/2007 | Nyhart | |
| 2007/0176905 A1 | 8/2007 | Shih et al. | |
| 2007/0196040 A1 | 8/2007 | Wang et al. | |
| 2007/0247872 A1 | 10/2007 | Lee et al. | |
| 2007/0262962 A1 | 11/2007 | XiaoPing et al. | |
| 2007/0271399 A1 | 11/2007 | Peng et al. | |
| 2008/0007541 A1 | 1/2008 | Eliasson et al. | |
| 2008/0018617 A1* | 1/2008 | Ng et al. | 345/176 |
| 2008/0278460 A1* | 11/2008 | Arnett et al. | 345/175 |
| 2009/0096760 A1 | 4/2009 | Ma et al. | |
| 2009/0184852 A1* | 7/2009 | Ahn et al. | 341/31 |
| 2009/0256817 A1 | 10/2009 | Perlin et al. | |
| 2009/0265670 A1* | 10/2009 | Kim et al. | 715/863 |
| 2009/0273570 A1 | 11/2009 | Degner et al. | |
| 2010/0079384 A1 | 4/2010 | Grivna | |
| 2010/0187422 A1* | 7/2010 | Kothari et al. | 250/353 |

FOREIGN PATENT DOCUMENTS

| | | |
|---|---|---|
| EP | 0 879 991 | 11/1998 |
| EP | 1 003 062 | 5/2000 |
| EP | 1 251 454 | 4/2002 |
| EP | 1 336 876 | 8/2003 |
| EP | 1 389 775 | 2/2004 |
| EP | 1 413 543 | 4/2004 |
| EP | 2 077 489 | 7/2009 |
| GB | 2321532 | 7/1998 |
| JP | 63-194285 A2 | 8/1988 |
| JP | 07-199829 | 8/1995 |
| JP | 09-281917 | 10/1997 |
| JP | 11-224524 | 8/1999 |
| JP | 11-227248 | 8/1999 |
| JP | 11260572 | 9/1999 |
| JP | 2001-119530 | 4/2001 |
| JP | 2001-243822 | 9/2001 |
| JP | 2001-320092 | 11/2001 |
| JP | 2002-163907 | 6/2002 |
| JP | 2002-174732 | 6/2002 |
| JP | 2003-045678 | 2/2003 |
| JP | 2004-186024 | 7/2004 |
| JP | 2004-212673 | 7/2004 |
| JP | 2006 065360 | 3/2006 |
| JP | 2008-103110 | 5/2008 |
| KR | 10-0754400 | 8/2007 |
| KR | 10-2008-0088683 | 10/2008 |
| WO | WO 99/04296 | 1/1999 |
| WO | WO 03/056876 | 7/2003 |
| WO | WO 2004/088372 | 10/2004 |
| WO | WO 2005/011012 | 2/2005 |
| WO | WO 2005/073622 | 8/2005 |
| WO | WO 2008/038754 | 4/2008 |
| WO | WO 2008/062363 | 5/2008 |

OTHER PUBLICATIONS

International Search Report and Written Opinion dated Jan. 11, 2010 for PCT Application No. PCT/US2009/056863.
Office Action dated Feb. 3, 2010 for U.S. Appl. No. 12/207,270.
Zhou et al. (1998) Waveguide panel display using electromechanical spatial modulators. SID International Symposium. Digest of Technical Papers. vol. 29:1022-1025.
ISR and WO dated Mar. 27, 2009 in PCT/US08/083678.
IPRP dated Feb. 24, 2010 in PCT/US08/083678.

* cited by examiner

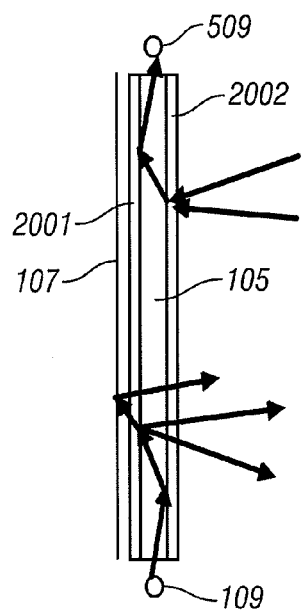 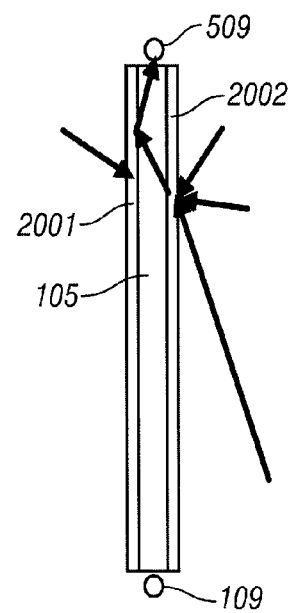
FIG. 16  FIG. 17
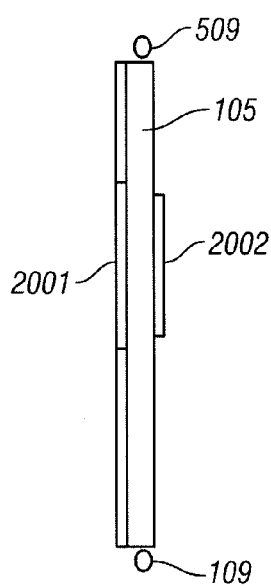 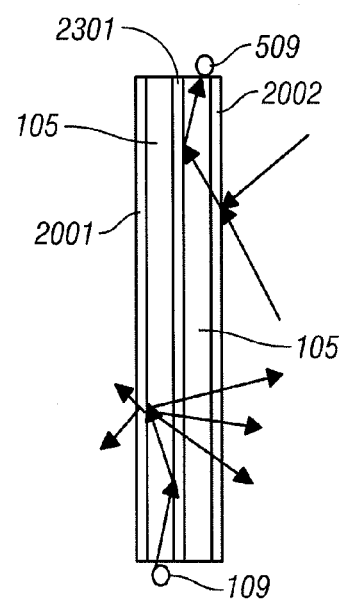
FIG. 18  FIG. 19

INTEGRATED LIGHT EMITTING AND LIGHT DETECTING DEVICE

CROSS-REFERENCE TO RELATED APPLICATIONS

This application claims the benefit of U.S. Provisional Application No. 61/147,044 filed on Jan. 23, 2009, titled "INTEGRATED LIGHT EMITTING AND LIGHT DETECTING DEVICE," which is hereby expressly incorporated by reference in its entirety.

BACKGROUND

1. Field

This invention relates to the fields of lighting and sensing, and in particular to light panels configured to emit light and/or detect light.

2. Description of the Related Art

A variety of architectural lighting configurations are utilized to provide artificial illumination in a variety of indoor and/or outdoor locations. Such configurations can include fixed and portable architectural lighting. Various configurations employ technologies such as incandescent, fluorescent, and/or light emitting diode based light sources.

One configuration of architectural lighting can be referred to generally as panel lighting. A panel lighting may include, for example, incandescent or fluorescent lighting in a light box behind a plastic lenticular panel. Panel lighting can be configured as a generally planar lighting devices, having width and length dimensions significantly greater than a thickness dimension. Panel lighting can use LED's as a light source, thus allowing its use in applications not suitable for normal incandescent or fluorescent light sources, including thinner panel configurations. Accordingly, improvements to panel lighting could allow its use for additional lighting applications not suitable for normal light sources.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other lighting devices.

At least some embodiments are based at least partially on a recognition that there exists an unsatisfied need for novel configurations of architectural lighting that offer improvements. For example, some embodiments provide a light panel configured to emit light and to detect a variation of light incident on the light panel. Some embodiments include a plurality of light turning features that direct light in one or more selected directions into or out of a light panel. Light received by a light panel may be guided within the light guide to one or more detectors.

According to one embodiment, the invention comprises a lighting device having a first light guide having a planar first surface and a planar second surface, at least one light gathering feature disposed on the first surface and configured to couple light incident on the first surface of the first light guide into the first light guide, and at least one light detector disposed along an edge of the first light guide coupled to the first light guide to receive light propagating therein, the at least one light detector configured to produce a control signal. In one aspect, the at least one light gathering feature comprises at least one of a diffractive feature, a reflective feature, a refractive feature, and a holographic film. In another aspect, the at least one light detector further comprises an output terminal, and wherein the at least one light detector is configured to provide the control signal to the output terminal for providing to a device electrically connected to the output terminal.

In one embodiment, the lighting device includes at least one light source optically coupled to at least one edge of the first light guide and at least one light turning feature configured to direct light propagating in the first light guide out of the first light guide. In one aspect, the control signal is configured to control at least a portion of the output of the at least one light source. In another aspect, the at least one turning feature includes more than one turning feature disposed on the front surface and/or back surface. In one aspect, the at least one light detector is configured to sense IR radiation and/or visible light and the at least one light source is configured to emit IR radiation and/or visible light. The light source can be configured to emit light having a wavelength within a first range and the at least one light detector can be configured to detect light having a wavelength within a second range and the first and second ranges can overlap or not overlap. In yet another aspect, the at least one light turning feature comprises a dot, groove, diffractive grating, hologram, and/or prismatic feature. In one aspect, the at least one light detector comprises a photodiode.

In another aspect, the at least one light detector includes a first detector disposed on a first edge of the first light guide and a second detector disposed on a second edge of the first light guide. In one aspect, the first and second detectors are each configured to provide control signals based on the light they receive. In another aspect, the first and second detectors can be coupled to a sensing circuit configured to determine a signal indicating a variation of light incident on the light guide based on the control signals. In one aspect the first edge can be disposed opposite the second edge. In yet another aspect, the sensing circuit signal can be configured to provide an indication of a direction of variation of incident light across the light guide. In one aspect, the first and second detectors are configured to produce a signal indicative of an object moving across at least a portion of the first surface that affects the light incident on the first surface.

In another aspect, the lighting device also includes a second light guide disposed parallel to the first light guide and an isolation layer disposed between the first light guide and the second light guide. The isolation layer can be configured to prevent at least some light propagating in the first light guide from entering the second light guide and/or to prevent at least some light propagating in the second light guide from entering the first light guide. In one aspect, the isolation layer comprises a material having a refractive index lower than the refractive index of the first and second light guide. In one aspect, the isolation layer has a refractive index that is between about 1.4 and about 1.6, the first light guide has a refractive index that is between about 1.4 and about 1.6, and the second light guide has a refractive index that is between about 1.4 and about 1.6. The isolation layer can include a material with an index of refraction between about 1.4 and about 1.6. In one aspect, the at least one light gathering feature comprises a dot, groove, diffractive grating, hologram, and/or prismatic feature.

According to another embodiment, the invention comprises a lighting system including a first lighting device having a first light guide having a planar first surface and a planar second surface, at least one light gathering feature disposed on the first surface and configured to couple light incident on the first surface of the first light guide into the first light guide, at least one light detector disposed along an edge of the first light guide coupled to the first light guide to receive light propagating therein, at least one light source optically coupled to at least one edge of the first light guide, and at least one light turning feature configured to direct light propagating in the first light guide out of the first light guide. The lighting system can also include a second lighting device configured to provide a control signal to the at least one light detector, wherein the at least one light detector is configured to control the light output from the at least one light source. In one aspect, the control signal comprises light output from the second lighting device. In another aspect, the light output from the second lighting device is pulse width modulated.

According to another embodiment, the invention comprises a method of manufacturing a lighting device including providing a light guide having a planar first surface and a planar second surface, disposing a first light detector along one or more edges of the light guide, the first light detector coupled to the first light guide to receive light propagating therein, disposing a second light detector along one or more edges of the light guide, the first light detector coupled to the first light guide to receive light propagating therein, forming a sensing circuit electronically coupled to the first light detector and the second light detector, the sensing circuit configured to determine a signal indicating a variation of light incident on the light guide based on signals provided by the first and second detector, forming at least one light gathering feature on at least one of the first surface and the second surface, the at least one light gathering feature configured to direct light incident on the light guide into the light guide, forming at least one light turning feature on at least one of the first and second surface, the at least one light turning feature configured to direct light propagating within the light guide away from the light guide, and disposing at least one light source along one or more edges of the light guide.

According to yet another embodiment, the invention comprises a lighting device including means for guiding light, means for detecting light, the means for detecting light disposed along one or more edges of the means for guiding light, the means for detecting light configured to detect light propagating within the means for guiding light, the means for detecting light further configured to produce a control means, and means for gathering light disposed on the means for guiding light, the means for gathering light configured to couple light incident on the means for guiding light into the means for guiding light. In one aspect, the means for guiding light comprises a light guide having a planar first surface and a planar second surface. In another aspect, the means for detecting light comprises at least one light detector disposed along an edge of the means for guiding light and coupled to the means for guiding light to receive light propagating therein. In one aspect, the means for gathering light comprises one or more light gathering features. In yet another aspect, the lighting device also includes means for producing light, the means for producing light coupled to the means for guiding light, and means for turning light disposed on the means for guiding light, the means for guiding light configured to direct light propagating within the means for guiding light away from the means for guiding light. In one aspect, the means for turning light comprises at least one light turning feature. In another aspect, the means for producing light comprises at least one light source.

According to one embodiment, the invention comprises a method of sensing movement of an object across a lighting panel based on the variation of light incident on the lighting panel, the lighting panel having at least two detectors coupled to the lighting panel, the method including at a first time, receiving light propagating within the lighting panel at the first detector and producing a first signal, the first signal indicating the amount of light detected by the first light detector at the first time, and receiving light propagating within the lighting panel at the second detector and producing a second signal, the second signal indicating the amount of light detected by the second detector at the first time, at a second time, receiving light propagating within the lighting panel at the first detector and producing a third signal, the third signal indicating the amount of light detected by the first light detector at the second time, and receiving light propagating within the lighting panel at the second detector and producing a fourth signal, the fourth signal indicating the amount of light detected by the second detector at the second time, and determining the direction of the movement of the object based on the first, second, third, and fourth signals. In one aspect, the method also includes emitting light from the light panel wherein receiving light propagating within the lighting panel at the first time and the second time comprises receiving ambient light that is incident on the lighting panel and light that was emitted from the light panel and reflected back toward the lighting panel.

BRIEF DESCRIPTION OF THE DRAWINGS

FIG. 16 is a side view schematically illustrating an embodiment of a light panel configured to emit and detect light disposed near a reflector.

FIG. 17 is a side view schematically illustrating an embodiment of a light panel configured to emit and detect light.

FIG. 18 is a side view schematically illustrating an embodiment of a light panel configured to emit and detect light.

FIG. 19 is a side view schematically illustrating an embodiment of a light panel configured to emit and detect light having two light guides separated by a low refractive index layer.

DETAILED DESCRIPTION OF CERTAIN EMBODIMENTS

The following detailed description is directed to certain specific embodiments of the invention. However, the invention can be embodied in a multitude of different ways. For example, features included in a light emitting panel may also be included in a light sensing panel. In this description, reference is made to the drawings wherein like parts are designated with like numerals throughout.

In various embodiments described herein, a light source and/or light detector, or sensor, is coupled to a light guide to form a light panel. The light guide may comprise a plate, sheet or film with light turning features, for example, light extraction dots, grooves, diffractive gratings, holograms, or prismatic features disposed on one or more of its surfaces. Ambient light that is incident on the light guide may be gathered and turned into the light guide by the light turning features and guided through the light guide by total internal reflection. A light detector, for example, a photodiode, may be disposed along one or more edges of the light guide and may sense the ambient light gathered and guided into the light guide by the light turning features. In other embodiments, a light source, for example, one or more light emitting diodes (LEDs) may also be disposed along one or more edges of the light guide. The light emitted by the light source may be guided through the light guide by total internal reflection and extracted from the light guide by the light turning features. In some embodiments, the light detector may be configured to detect light that has entered the light guide. The detected light may be ambient light that has entered the light guide, and/or light emitted by the light source and extracted by the light turning features that is later reflected back into the light guide. In some embodiments, two differently configured sets of light turning features can be disposed on the light panel surfaces (e.g., intermingled). One set of light turning features can be configured to extract light from the panel, the other set to divert incident (ambient) light into the light panel.

Figure 1:
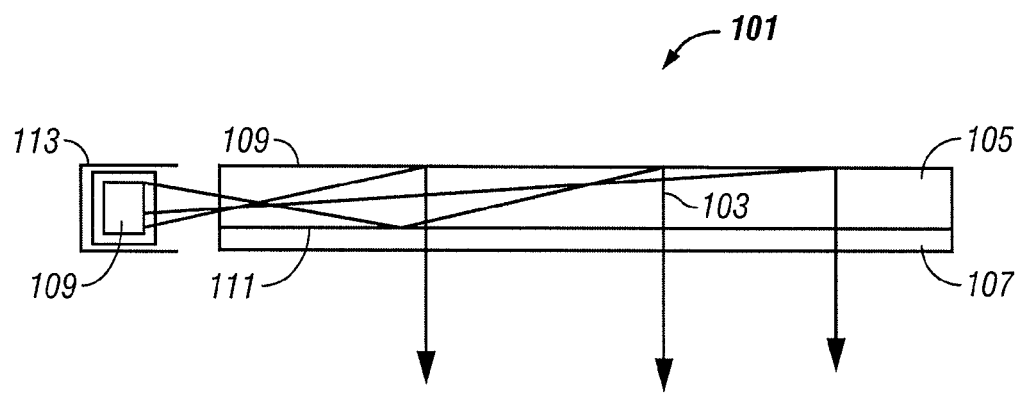
FIG. 1 is a side view schematically illustrating one embodiment of a light panel configured to emit light.

Turning now to FIG. 1, a light panel 101 is shown including a light guide 105 and a light source 109. The light panel 101 is configured to generate and emit light in one or more directions. The light guide 105 is configured to receive light 103 generated and emitted by the light source 109, propagate the light within the light guide 105, and redirect the light 103 such that at least a portion of the light 103 is emitted from the light panel 101 along the one or more selected emission directions. The light guide 105 can utilize the property of total internal reflection ("TIR") and optical characteristics of light turning features that are disposed on a surface of the light guide 105 to direct and redirect light from the light source 109 through the light guide 105 and to emit light in the desired direction.

Still referring to FIG. 1, the light guide 105 may comprise optically transmissive material that is substantially optically transmissive to radiation at one or more wavelengths. For example, in one embodiment, the light guide 105 may be substantially optically transmissive to wavelengths in the visible and near infra-red region. In other embodiments, the light guide 105 may be transparent to certain wavelengths, for example, in the in the ultra-violet or infra-red regions.

The light guide 105 may comprise a substantially optically transmissive plate, sheet or film. The light guide 105 may be planar or curved. The light guide 105 may be formed from rigid or semi-rigid material such as glass or acrylic so as to provide structural stability to the embodiment. In other embodiments, the light guide 105 may be formed of flexible material such as a flexible polymer. Other materials for example, PMMA, polycarbonate, polyester, PET, cyclo-olefin polymer, or Zeonor may be used to form the light guide 105 in several other embodiments. In other embodiments, the light guide 105 may be formed of any material with an index of refraction greater than 1.0. The thickness may, in some embodiments, determine whether the light guide 105 is rigid or flexible. The optical transmissive properties, and the materials, of the light guide 105 can also be embodied on other light guides described herein.

Still referring to the embodiment shown in FIG. 1, the light guide 105 comprises two larger area surfaces and four smaller edge surfaces. In some embodiments, an upper surface 109 may be configured to emit light extracted by the light panel 101 or to receive ambient light. In some embodiments, a bottom surface 111 of the light guide may be connected to a substrate 107 and/or be configured to emit light extracted from the light guide 105. In various embodiments, the substrate 107 may be opaque, partially or substantially completely optically transmissive, or transparent. The substrate 107 may be rigid or flexible. The light guide 105 may be connected to the substrate 105 using a low refractive index adhesive layer (e.g., a pressure sensitive adhesive). Substrate 107 may comprise a diffuser. In certain embodiments, the substrate 107 may comprise a diffuser comprising an adhesive with particulates therein for scattering, for example, a pressure-sensitive adhesive with diffusing features. In some embodiments, the diffuser may also be formed using holographic recording techniques. The light guide 105 may be bounded by a plurality of edges all around. In some embodiments, the length and width of the light guide 105 is substantially greater than the thickness of the light guide 105. The thickness of the light guide 105 may be between 0.1 mm to 10 mm. The area of the light guide 105 may be between 1.0 cm$^2$ to 10,000 cm$^2$. However, dimensions outside these ranges are possible. In other embodiments, the light panel 101 may comprise a luminaire or a privacy screen.

Still referring to FIG. 1, the light guide 105 may be coupled with a light source 109. In some embodiments, the light guide 105 can be coupled with a light sensor (not shown). The light source 109 may be disposed along one or more edges of the light guide 105. The light source 109 may comprise any of a variety of light source technologies including fluorescent lamps, incandescent bulbs and/or LEDS. In some embodiments, the light source 109 may comprise one or more of a plurality of localized light sources, for example, one or more incandescent bulbs and/or LEDs and/or an array of LEDs. In some embodiments, an optional reflector 113 will be disposed near the light source 109 to direct the light emitted from the light source in one or more desired directions. It will be understood that depending on the particular implantation, an appropriate source of power will be included to provide operating power to the light source 109. Such power sources can include but are not limited to batteries, photovoltaic cells, fuel cells, generators, and/or an electrical power grid. It will also be understood that the light panel 101 will generally be provided with appropriate control circuitry which can include but need not require switches, voltage control circuitry, current control circuitry, ballast circuits, and the like. The power and control components of the light panel 101 are not illustrated for clarity and ease of understanding, however, appropriate power supply and control circuitry components will be understood by one of ordinary skill. As shown in the embodiment of FIG. 1, light 103 may propagate from the light source 109 through the light guide 105 and be directed from the light guide 105 towards one or more directions.

Figure 2:
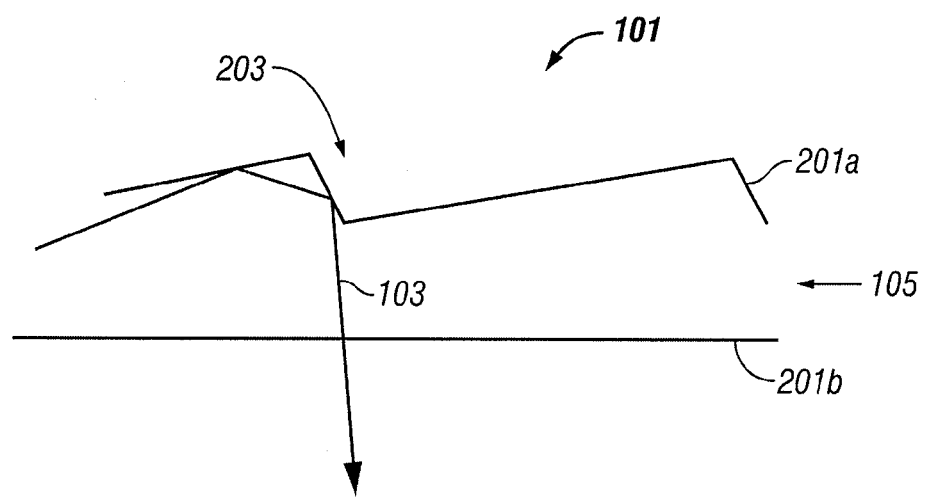
FIG. 2 is an enlarged view of a portion of the light panel depicted in FIG. 1.

Turning now to FIG. 2, an enlarged side view of the light panel 101 shown in FIG. 1 depicts a portion of the upper surface 201a of the light guide 105 and the bottom surface 201b of the light guide 105. As shown in this embodiment, light 103 propagating through the light guide 105 may be trapped within the light guide 105 by total internal reflection until it encounters light turning features 203 formed in the upper surface 201a of the light guide 105. When the light 103 encounters a light turning feature 203, some of the light 103 may be extracted from the light guide 105 and turned towards the bottom surface 201b of the light guide 105. The light turning features 203 may comprise any feature configured to turn or extract light, for example, refractive features, dots, grooves, pits, prismatic features, holograms, or diffractive gratings. The light turning features 203 may be formed by a variety of techniques such as embossing or etching. Other techniques of forming the turning features may also be used. In some embodiments, the turning features 203 may be formed or disposed on a film that forms a part of the light guide 105 and is adhered to a surface of the light guide 105 (e.g., by lamination). In certain embodiments, the turning features 203 may also be disposed in or on the light guide 105. In one embodiment, the light turning features 203 comprise a plurality of elongate ridge or prism structures extending substantially across the upper surface 201a of the light guide 105. In another embodiment, a light guide 105 may comprise light turning features 203 on both sides and extract light from within the light guide in both directions. In one embodiment, the upper surface 201 comprises a plurality of microprisms extending along the width of the light guide 105. The microprisms may be configured to receive light propagating through the light guide 105 and turn light 103 through a large angle, for example, between about 70-90°.

Figure 3:
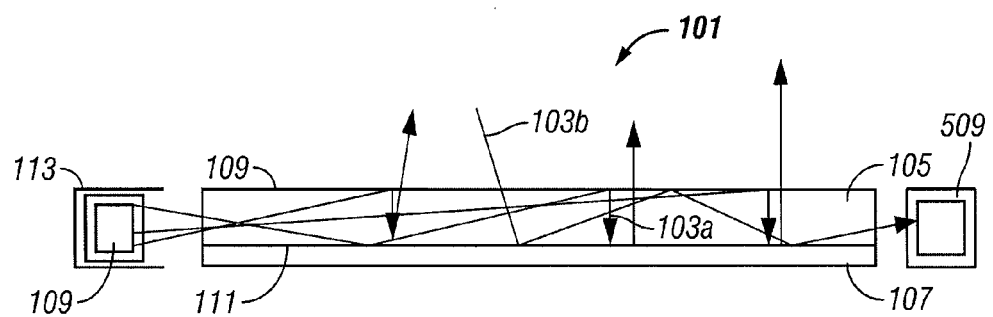
FIG. 3 is a side view schematically illustrating one embodiment of a light panel that may be coupled with a reflective display.
Figure 4:
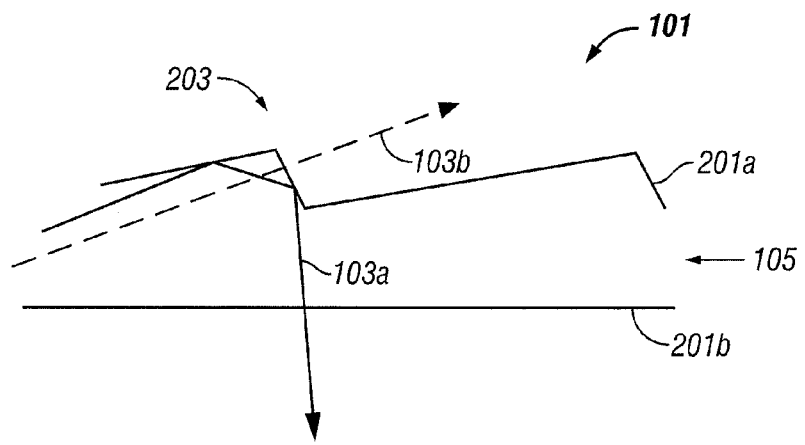
FIG. 4 is an enlarged view of a portion of the light panel depicted in FIG. 3 illustrating light turning features.

Turning now to FIG. 3, an embodiment of a light panel 101 is shown. In this figure, light rays 103 may be extracted by light extracting features (not shown) in the light guide 105 and then reflected back through the light guide 105 by a reflective surface 111, for example, an interferometric modulator. As shown in FIG. 4, some of the light 103b propagating through the light guide 105 may "leak" through the upper surface 201a of the light guide 105 when incident at certain grazing angles while another portion of the light 103a propagating through the light guide 105 may be turned by light turning features 203 formed on the upper surface 201a. Thus, a portion of light 103a emitted by the light source may be directed out of one side of the light guide 105 while another portion of light 103b may be directed out of the other side of the light guide 105.

Referring to FIG. 3 again, the light panel 101 may also include one or more light detectors (or sensors) 509. In various embodiments, sensor 509 may be disposed along one or more edges of the light guide 105. The sensor 509 is configured to detect light 103 that travels within the light guide 105 to the light detector 509. The sensor 509 may detect light 103a that is input into the light guide 105 by the light source 109 and/or the sensor 509 may detect light 103b that is incident on the top surface of the light guide 105. Light 103b that is incident on the light guide 105 may be ambient light and/or light emitted by the light source 109 that is reflected back into the panel 101. The sensor 509 may be configured to sense, for example, visible light waves or infra-red waves. In one embodiment, the sensor 509 may comprise a photodiode.

Figure 5:
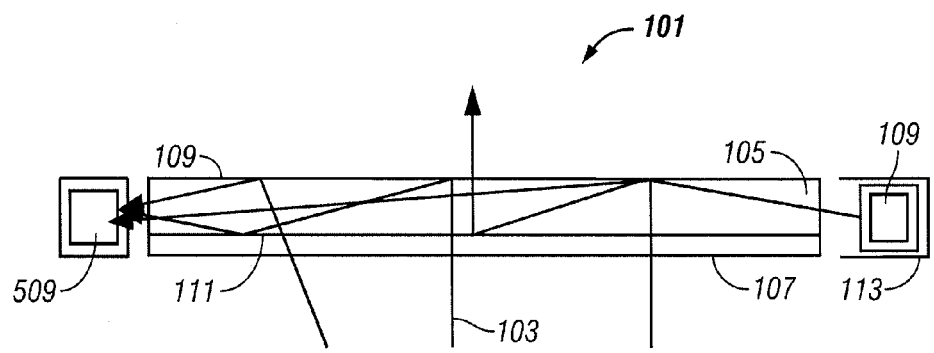
FIG. 5 is a side view of a light panel illustrating one embodiment configured to detect ambient light incident on one or more surfaces of the light panel.

Turning now to FIG. 5, a light panel 101 configured to detect light is shown including a light guide 105 and at least one light detector (or sensor) 509. The light guide 105 may comprise optically transmissive material that is substantially optically transmissive to radiation at one or more wavelengths. The light guide 105 may comprise two surfaces. In some embodiments, one of the surfaces may be adhered to a substrate 107. The light guide 105 may include one or more light gathering features (not shown) configured to receive light incident on the light guide 105 and direct the light through the light guide 105. The light gathering features can turn the angle of incident rays of light inside the light guide 105 such that the ray of light 103 can be guided within the light guide 105 by total internal reflection. In some embodiments, the light gathering features may be embodied in a microstructured thin film. In some embodiments, light gathering features can be volume or surface diffractive features, or holograms disposed on one or more surfaces of the light guide 105.

The thickness of the light gathering features may range from approximately 1 μm to approximately 100 μm in some embodiments but may be larger or smaller. In some embodiments, the thickness of the light gathering features or layer may be between 5 μm and 50 μm. In some other embodiments, the thickness of the light gathering features or layer may be between 1 μm and 10 μm. The light turning gathering feature may be attached to surfaces of the light guide 105 by an adhesive. The adhesive may be index matched with the material comprising the light guide 105. In some embodiments, the adhesive may be index matched with the material comprising the light gathering feature. In certain other embodiments, light gathering features may be formed on the upper or lower surfaces of the light guide 105 by embossing, molding, or other process. Thus, the light guide 105 can be configured to receive light incident on one or more surfaces of the light guide from one or more directions, and direct the light through the light guide to the sensor 509.

Still referring to FIG. 5, the volume or surface diffractive elements or holograms can operate in transmission or reflection mode. The transmission diffractive elements or holograms generally comprise optically transmissive material and diffract light passing there through. Reflection diffractive elements and holograms generally comprise a reflective material and diffract light reflected therefrom. In certain embodiments, the volume or surface diffractive elements/holograms can be a hybrid of transmission and reflection structures. The diffractive elements/holograms may include rainbow holograms, computer-generated diffractive elements or holograms, or other types of holograms or diffractive optical elements. In some embodiments, reflection holograms may be preferred over transmission holograms because reflection holograms may be able to collect and guide white light better than transmission holograms. In those embodiments, where a certain degree of transparency is required, transmission holograms may be used. Transmissive layers may also be useful in embodiments that are designed to permit some light to pass through the light guide to spatial regions beneath the light guide. The diffractive elements or holograms may also reflect or transmit colors for design or aesthetic purpose. In embodiments, wherein the light guide is configured to transmit one or more colors for design or aesthetic purposes, transmission holograms or rainbow holograms may be used. In embodiments, wherein the light guide may be configured to reflect one or more colors for design or aesthetic purposes, reflection holograms or rainbow holograms may be used.

Still referring to FIG. 5, in some embodiments, the amount of light collected and guided by a light guide 105 can be referred to as the light collection efficiency of the light guide. Therefore, light turning features disposed on the light guide 105 can increase the light collection efficiency of the light guide 105. At least a portion of the light collected by the light guide 105 propagates to one or more sensors 509 disposed at one or more edges of the light guide. The sensors 509 may comprise detectors capable of sensing light waves, for example, visible light waves or infra-red waves. In one embodiment, the sensor 509 may comprise a photodiode capable of converting light into electrical energy (e.g., current or voltage) depending on the mode of operation of the photodiode. The electrical output from the sensor 509 can indicate a change in light falling onto the light guide 105, for example, from a change in ambient light conditions, or from an object positioned close enough to the light panel 101 to block ambient light from its surface. In some embodiments, the electrical output is a control signal used to trigger certain events, including to turn on or increase the light panel output due to low ambient light conditions, or to trigger another control event (for example, closing or opening a switch). In other embodiments, the sensor 509 can comprise control circuitry and the control circuitry can use the electrical output to create one or more control signals.

The embodiment illustrated in FIG. 5 also comprises a light source 109. Some embodiments do not include such a light source and instead sense only ambient light. The light source 109 may be disposed along one or more edges of the light guide 105 and may be configured to input light into the light guide 105. The light source 109 may comprise any of a variety of light source technologies including fluorescent lamps, incandescent bulbs and/or LEDS. In some embodiments, the light source 109 may comprise one or more of a plurality of localized light sources, for example, one or more incandescent bulbs and/or LEDs and/or an array of LEDs.

Figure 6:
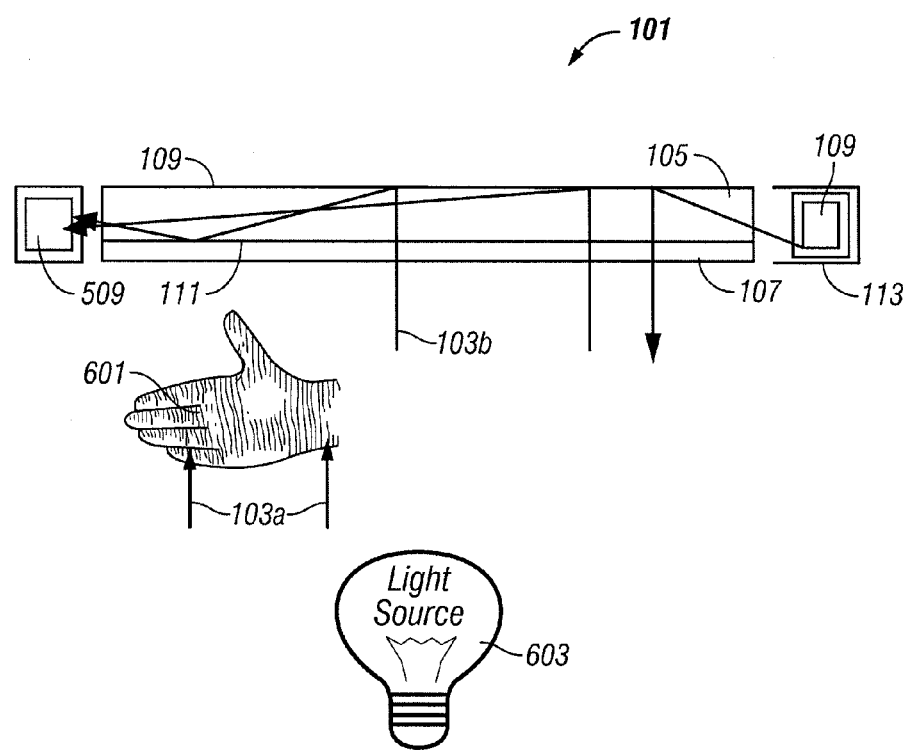
FIG. 6 is a side view of a light panel illustrating one embodiment which is configured to detect light incident on a surface of the light panel where at least some of the incident light is provided by a light source.

Turning now to FIG. 6, the light panel 101 shown in FIG. 5 is depicted with an external light source 603 that may illuminate the light panel 101. Light emitted from the external light source 603 may be gathered by light gathering features (not shown) disposed on the surface of the panel 101 proximate to the light source 603 and propagate through the light guide 105 to one or more sensors 509. The external light source 603 may comprise ambient light or another source of light, for example, an incandescent light. A portion of the light emitted by the external light source 603 may be blocked by one or more objects 601 that lie between the external light source 603 and the light sensing light panel 101. For example, a hand, or similar object, may intercept light 103a emitted by the external light source 603 and prevent the sensor 509 from detecting the light 103a while another portion of light 103b emitted from the external light source 603 may be guided into the light guide 105 and detected by the sensor 509. In such embodiments, the light sensing light panel 101 may be used as a control for a light source to determine how much light should be emitted by the light source based on the amount of ambient light received by the sensor 509. In other embodiments, a light sensing light panel 101 may be used as a proximity sensor, a lighting fixture; or an occupancy sensor. For example, a light sensing panel 101 may be used to turn on, turn off, or dim a light emitting panel as the motion of an object, for example, a hand, across the light sensing panel 101 leads to specific electrical signatures. In one embodiment, the sensor 509 may be used to detect the amount of light incident on the light panel 101 and control the amount of light emitted by the light panel by the optional light source 109.

Figure 7:
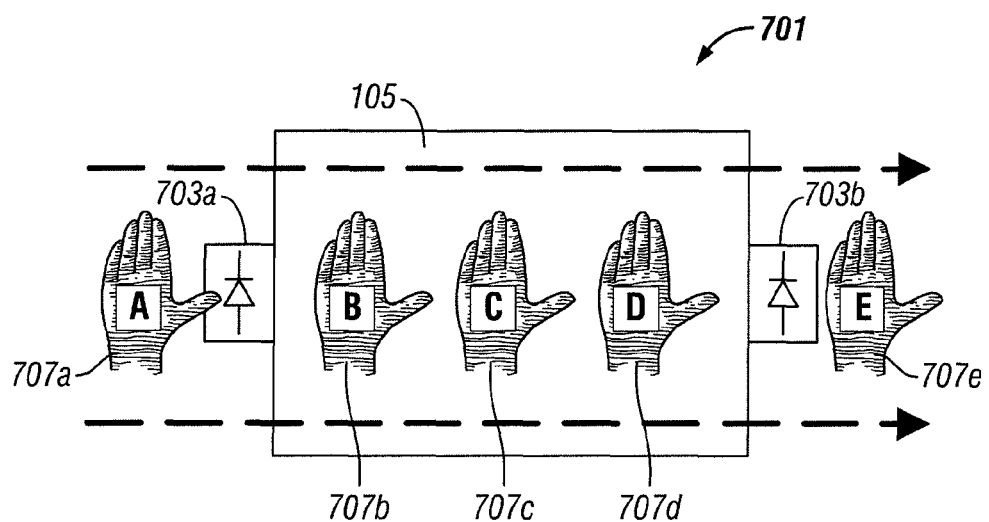
FIG. 7 is a top view schematically illustrating one embodiment of a light panel configured to detect variations in light incident on a surface of the light panel, including variations caused by moving an object (e.g., a hand) across a surface of the light panel.

Turning now to FIG. 7, an embodiment of a light panel 701 is depicted. The light panel 701 is configured to detect light and includes a light guide 105 and two photodiodes 703a,b disposed along two opposite edges of the light guide 105. The light guide 105 may comprise light gathering features (not shown) configured to gather light received by the light guide 105 and turn the light such that the light propagates through the light panel 105 to the photodiodes 703a,b. For example, the light guide 105 may comprise acrylic with light gathering dots printed upon the piece of acrylic. The light gathering dots may comprise diffusive particles configured to scatter light and turn the light into the light guide 105. The photodiodes 703a,b may be electrically connected such that they may detect the motion, or location, of an object that is moved across the light guide 105. Such embodiments are further described in reference to FIGS. 8 and 9. For example, the photodiodes 703a,b may be connected to form a differential amplifier. In one embodiment, an object, for example, a hand, may move across the light guide 105 from left to right in five positions 707a, 707b, 707c, 707d, and 707e with each position changing the amount of light detected by each photodiode 703a,b.

Figure 8:
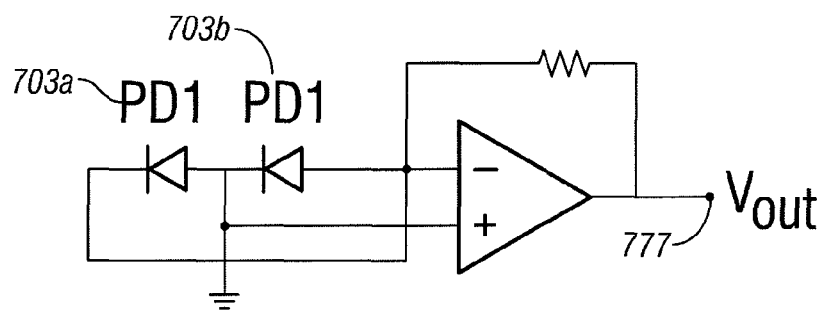
FIG. 8 is a diagram schematically illustrating two photodiodes electrically connected in a configuration to provide a signal corresponding to the direction a sensed object moves across a surface of the light panel.

Turning to FIG. 8, a diagram shows one example of an electrical connection between two photodiodes 703a,b illustrated in FIG. 7. The photodiodes 703a,b form a differential amplifier that outputs an electrical signal indicating the difference in light sensed by the two photodiodes 703a,b. The electrical signal output by the differential amplifier can be received by another device within a light panel and/or received by a device outside of the light panel. For example, the photodiodes may be electrically connected with a light source within a light panel and/or another electrical device housed outside of the light panel. In some embodiments, the photodiodes may be electrically connected with an output terminal 777 configured to electrically connect a light panel with another device.

Figure 9:
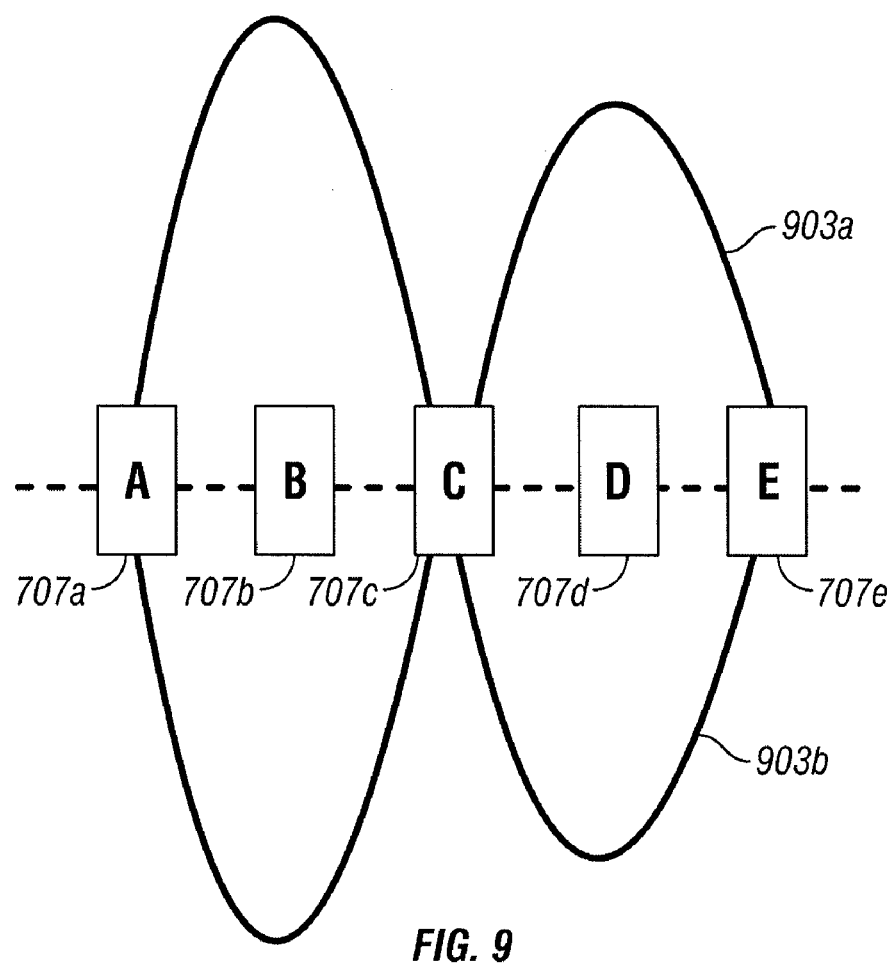
FIG. 9 is a diagram schematically illustrating signals based on the output of the two photodiodes depicted in FIG. 7 as a hand is moved across the light panel.

Turning now to FIG. 9, the output of the photodiodes 703a,b shown in FIG. 7 is shown as an object is moved from position 707a to 707e. Line 903a depicts the output of light sensed by photodiode 703a and line 903b depicts the output light sensed by photodiode 703b. When the object (e.g., the hand shown in FIG. 7) is in position 707a, the light panel 701 is unobstructed by the object. When the object is in position 707b, the object obstructs light near photodiode 703a and photodiode 707a detects less light than the other photodiode 703b. When the object is in position 707c, it is equidistant from both of the photodiodes 703a,b and each photodiode 703a,b detects the same amount of light. When the object is in position 707d, it is closer to photodiode 703b and photodiode 703b detects less light than the other photodiode 703a. Lastly, when the object is in position 707e, it does not obstruct the light panel 701 and each photodiode 703a,b detects the same amount of light. By connecting the photodiodes as shown in FIG. 8, the sequencing of positive and negative voltage pulses output by the photodiodes may indicate the direction of motion and can be used as a control mechanism. For example, an object moving from left to right over panel 101 may be used as a signal to turn a light emitting panel off or dim the panel. In another example, an object moving from right to left over a panel 101 may be used as a signal to turn a light emitting panel on or increase the amount of light emitted. In other embodiments, a constant obstruction over a particular part of the panel may trigger an event. For example, holding a hand over panel 101 in position 707a may turn something on or off. Additionally, the distance of an object, for example, a hand, from the panel 101 may further affect the outputs of the photodiodes 703a,b and be used as a control mechanism. The photodiodes 703a,b may be configured to detect various wavelengths of light. For example, in one embodiment the photodiodes 703a,b may be configured to detect visible light and in another embodiment the photodiodes may be configured to detect waves in the infra-red. In other embodiments, more photodiodes may be disposed along the light guide in order to increase the sensitivity of the light panel.

Figure 10:
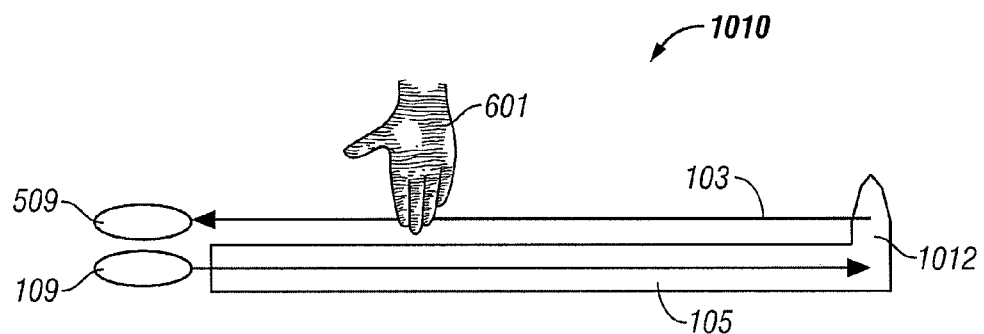
FIG. 10 is a side view schematically illustrating one embodiment of a panel configured to emit light across the panel and light an object proximate to the panel

Turning now to FIG. 10, a light panel 1010 configured to emit and/or detect light is shown. The light emitting and light sensing panel 1010 includes a light guide 105. The light guide 105 may comprise optically transmissive material that is substantially optically transmissive to radiation at one or more wavelengths. A light source 109 is disposed along at least one edge of the light guide 105 and is configured to input light 103 into the light guide 105. The light 103 travelling within the light guide 105 may be trapped by total internal reflection until it reaches a turning feature 1012. Turning feature 1012 may be formed on the light guide 105 and may be configured to turn and direct light 103 out of the light guide 105 in one or more particular directions. The light panel 101 may also include a light detector 509 disposed along at least one edge of the light guide 105. The light detector 509 may be configured to detect light travelling in one or more directions towards the light detector. In one embodiment, the light detector 509 is configured to detect light 103 directed by turning feature 1012. The light detector 509 may be configured to act as a control mechanism to control something based on the amount of light detected. For example, the light detector 509 may be configured to act as a switch that turns a device off or on depending on whether light is detected. In one example, an object 601, for example, a hand, may be used to obstruct light 103 directed toward the light detector 509 by light turning feature 1012. When the object 601 obstructs the light directed to the light detector 509, the light detector 509 may detect less light and perform some control function.

Figure 11:
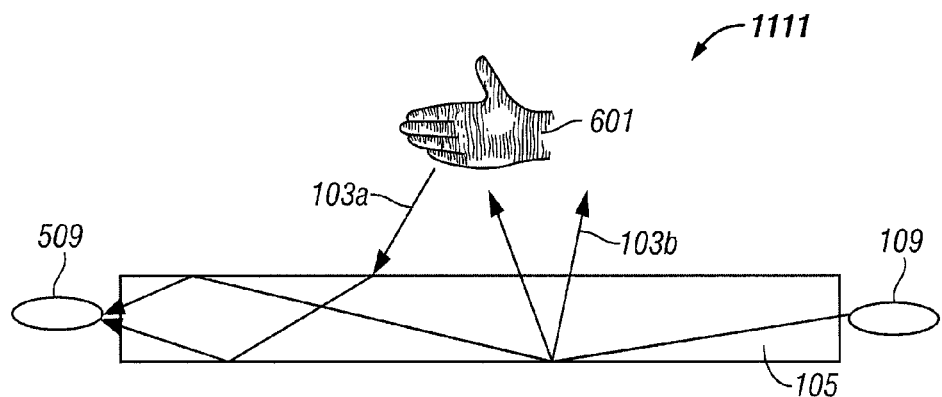
FIG. 11 is a side view schematically illustrating one embodiment of a panel configured to emit light and detect variations in light falling incident an object proximate to the panel.

Turning now to FIG. 11, a light panel 1111 configured to emit and/or detect light is shown. The light panel 1111 includes an optically transparent light guide 105. The light guide 105 may comprise optically transmissive material that is substantially optically transmissive to radiation at one or more wavelengths. A light source 109 is disposed along at least one edge of the light guide 105 and is configured to input light 103b into the light guide 105. A light detector (or sensor) 509 is also disposed along at least one edge of the light guide and is configured to detect light 103a that travels within the light guide 105 to the light detector 509. The light guide 105 may include a plurality of light turning features (not shown) and light gathering features (not shown). The light turning features may be configured to extract light 103b from within the light guide 105 and direct the light towards one or more particular directions. The light guide 105 may comprise light turning features on one or more sides and the light turning features may comprise any feature configured to turn or extract light, for example, refractive features, dots, grooves, pits, prismatic features, holograms, or diffractive gratings. The light guide 105 may also include one or more light gathering features (not shown) configured to receive light 103a incident on the light guide 105 and direct the light 105a through the light guide 105 toward the light detector 509. The light gathering features can turn the angle of incident rays of light 103a inside the light guide 105 such that the light can be bound within the light guide 105 by total internal reflection. In some embodiments, the light gathering features may be a microstructured thin film, volume or surface diffractive features, or holograms.

Still referring to FIG. 11, the light emitting and light sensing panel 1111 can be configured to simultaneously emit light from one or more sides of light guide 105 and detect light received by one or more sides of light guide 105. The light detector may be configured as a control mechanism to control the amount of light 103b emitted from the light source 109. For example, if the light detector 509 detects a threshold amount of ambient light, the light detector may turn the light source 109 off or dim the light source 109. In another example, if the light detector 509 does not detect a threshold amount of ambient light, the light detector 509 may increase the amount of light emitted by the light source 109. In another example, the light detector 509 may be configured to detect infra-red light and be configured as an occupancy sensor. In this example, the light detector 509 may turn the light source 109 on when infra-red light is detected and may turn the light source 109 off when infra-red light is not detected. As previously discussed with respect to FIGS. 7-9, a light sensing panel may be configured to detect a certain motion or location of an obstruction. The light emitting and light sensing panel 1111 depicted in FIG. 11 can also be configured to detect the location of a source of light gathered by the light guide 105 and/or to detect a certain motion of an object that comes between the light guide 105 and an external light source. In one embodiment, the light panel 1111 may be configured to emit light and detect ambient light or emitted light that is reflected back towards the light guide 105. For example, the light panel may be configured to emit a certain amount of light and the light detector may be configured to detect when an object 601 is placed near the light guide 105 based on the amount of emitted light that is reflected by the object 601 back towards the light guide 105. Additionally, in other embodiments, the light emitting and light sensing panel 1111 can detect light received on either side of the light guide 105 while simultaneously emitting light from one or both of these sides.

Figure 12:
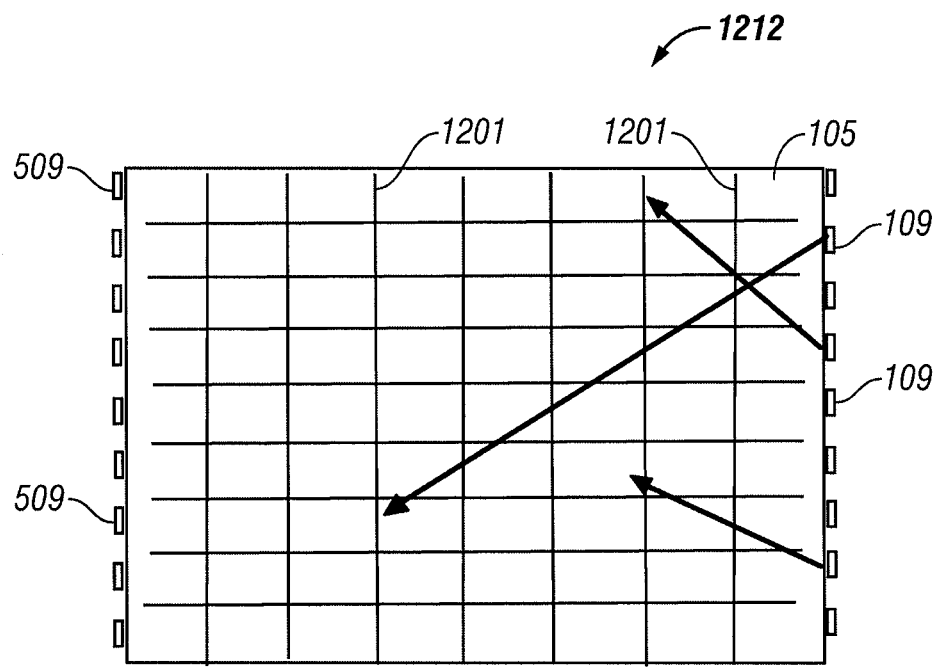
FIG. 12 is a top view schematically illustrating one embodiment of a light panel.
Figure 13:
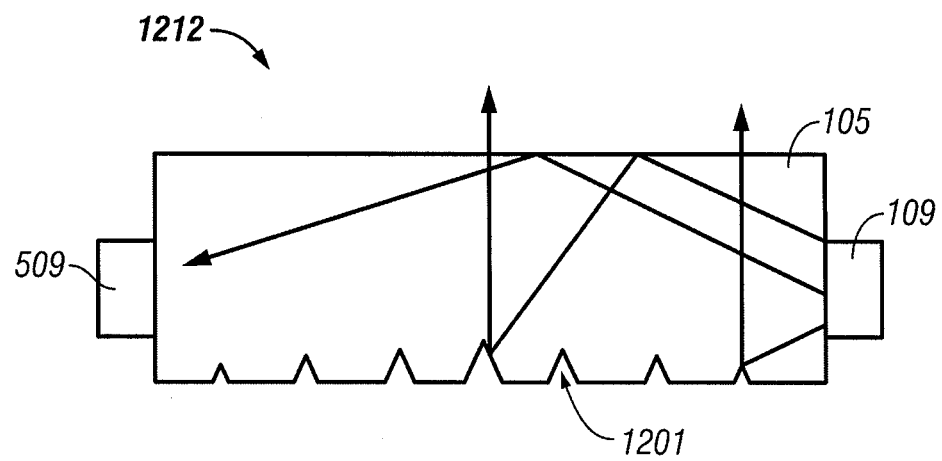
FIG. 13 is a side view schematically illustrating the light panel depicted in FIG. 12.

FIG. 12 illustrates a top schematic view of an embodiment of a light panel 1212 showing one type of light turning or gathering feature. In this example, the light panel 1212 may be configured to emit and/or gather light. The light panel 1212 includes features 1201. Features 1201 may be configured to extract light from within the light guide 105 or to gather light incident upon the light guide 105 and direct the light into the light guide 105. The features 1201 may be embossed or machines into light guide 105. The light sources 109 may comprise LEDs or any other suitable light source including linear light sources. Additionally, optional light detectors 509 may be disposed along one or more edges of the light guide 105. The light detectors 509 may be configured to detect the light that travels within the light guide 105 to the light detectors 509 and may be used to control the amount of light emitted by the light sources 109, among other things. For example, the light detectors 509 may be used to detect the amount of light that is incident on the light panel 1212 and trigger an event if the amount of light detected is more or less than certain threshold values. As shown in the embodiment of FIG. 13, light may propagate from the light sources 109 through the light guide 105 by total internal reflection until it encounters light a light turning feature 1212. When the light encounters light turning features 1212, some of the light may be extracted from the light guide 105 and be turned towards the front (or back) planar side making the light panel 1212 appear bright to a viewer. The light panel 1212 may also include light gathering features (not shown) configured to direct light incident on the light guide 105 towards the light detector 509.

Figure 14:
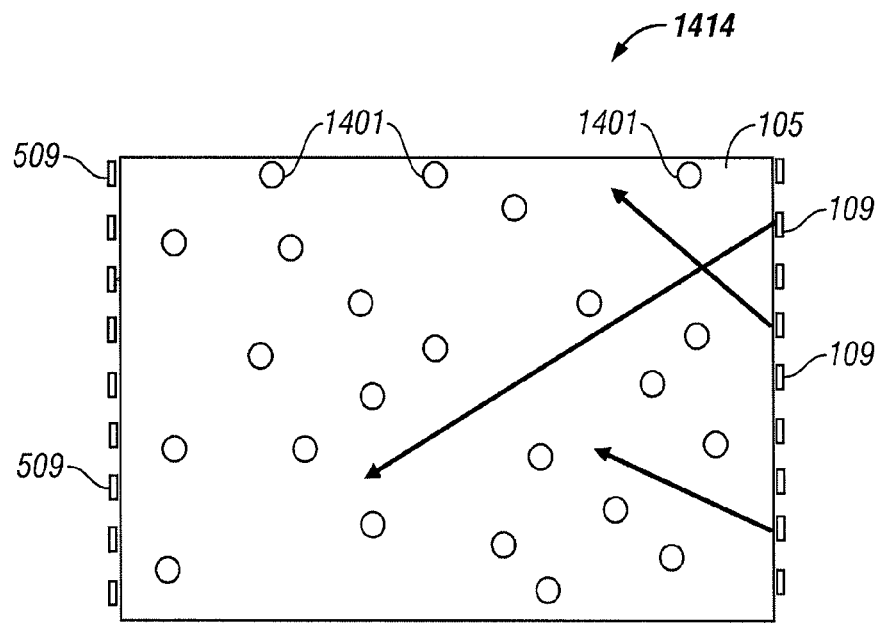
FIG. 14 is a top view schematically illustrating one embodiment of a light panel.

Turning now to FIG. 14, a light panel 1414 is depicted. In this example, the light panel 1414 may be configured to emit and/or gather light. The light panel 1414 includes printed light extraction dots. Dots 1401 may be printed upon the front, back, or both front and back surfaces of the light guide 105 to extract light input into the light guide 105 by light source 109 or to gather light incident on the light guide. Printed dots 1401 can be used to tailor the transparency and diffusion of the panel when in ambient light, un-illuminated by a light source 109. Additionally, dots 1401 can be used to create uniform or non-uniform light extraction, with light output on the front, back, or both sides of the light guide 105. When the light guide 105 is illuminated by light sources 109, the dots 1401 can be used to direct light toward a viewer. In some embodiments, the dots 1401 may comprise, for example, diffusive particles or opaque materials, and be configured thicker or with higher density to limit light transmission through the panel. In one embodiment, some dots 1401 may be configured to emit light input into the light guide 105 by the light sources 109 while other dots 1401 may be configured to gather light incident on the light guide 105 and direct the light through the light guide towards one or more light detectors 509. Thus, the light panel 1414 may be used as a light emitting and/or light sensing panel.

Figure 15:
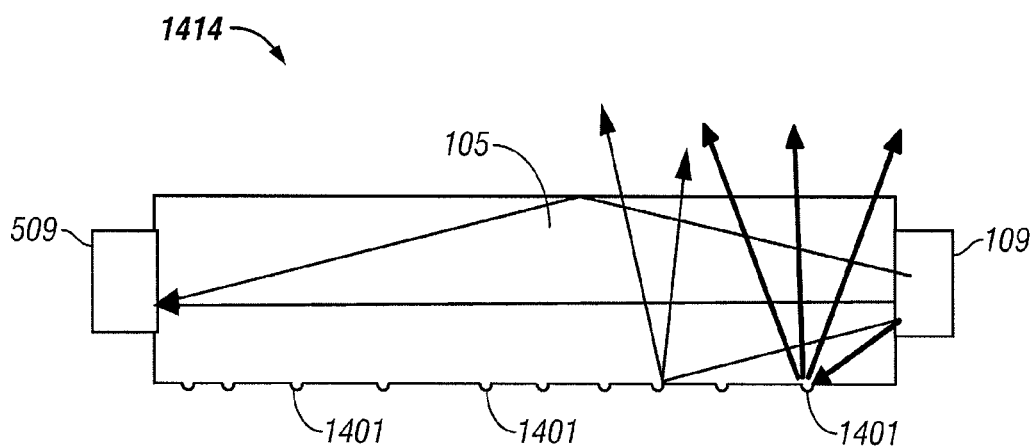
FIG. 15 is a side view schematically illustrating the light panel depicted in FIG. 14.

Turning now to FIG. 15, printed dots 1401 used as an alternative to machined/embossed features offer a low cost, flexible design (e.g., controllable efficiency and uniformity), and flexibility of light guide 105 material (e.g., dots can be used on many substrates including glass and plastic). Additionally, the dots 1401 can be simple to manufacture, may require a relatively low capital expenditure to manufacture, and are highly configurable. For example, the dots 1401 may be printed onto the light guide 105 by an ink jet printer, screen printing techniques, or any other ink printer. The dots may also be rolled, splattered, or sprayed onto the light guide 105.

Turning now to FIG. 16, one embodiment of a large area light panel is depicted. Large area light panels can be optimized for the required lighting performance. For example, certain light extracting features can be selected to be disposed on either a front surface, a back surface, or both. Also, light sources of different wavelengths can be used. Such optimized configurations can also include light detectors having different sensitivities (e.g., to different light of wavelengths, or intensity). Light turning features may be used to extract light that was injected into the panel edges, out of the panel for illumination. The light turning features can naturally operate in a reciprocal mode to turn light incident on the panel into the panel where it can propagate by total internal reflection (TIR) toward sensors coupled to the light guide such that they receive a portion of the light propagating within the light guide, allowing the panel to operate as a dual mode device (emitter/sensor), or if a light source is omitted, as a sensor only. Some applications of a large area light panel may require the sensing performance to be optimized in a different way than the lighting functionality. For example, a panel may be configured to sense infra-red waves and emit visible light. In another example, a light panel may be configured as a broad, uniform light panel with infra-red occupancy sensing in one or more directions only. In another example, a light panel may be configured to provide uniform lighting while sensing may be limited to a small area of the panel, for example, for control purposes. In such examples, light detectors and sensors can be selected that are operable for different wavelengths (or frequencies) of light, such that the light emitting functionality has a minimal (or no) impact on the sensing functionality.

Still referring to FIG. 16, one embodiment of a large area light panel includes a light guide 105. Disposed along one or mores edges of the light guide 105 may be one or more light detector (or sensor) 509 and one or more light source 109. The light gathering features may be configured to direct light incident on the light guide 105 into the light guide 105 and towards the light detector 509. The light gathering features 2002 may be optimized for light detecting or sensing. Also, light turning features 2001 may be disposed on more or more surface of the light guide 105. The light turning features may be configured to extract light that is input into the light guide 105 by the light source 109 from the light guide 109 towards one or more directions. The light turning features 2001 can comprise prismatic facets, printed dots, diffractive (e.g., holographic features), etc. The light turning features 2001 can have wavelength spectrum selectivity. For example, some infra-red light used for sensing may be scattered at the surface of the light guide 105, but at least some of the light will enter the light guide and propagate via TIR to the light detector 509. For improved detecting, in some embodiments, light turning features can be made less sensitive to the wavelengths used for sensing. In some embodiments, light gathering features 2002 are configured to not interact with visible light wavelengths and may be optimized for sensing particular wavelengths (e.g., infra-red). For example, a holographic film may be laminated to the panel. A holographic film may be customized to turn incident light into the panel, selecting only certain wavelengths or with specific directionality. In one example, a film could be bonded to the panel using a pressure sensitive adhesive of higher or equal index to the film. An optional substrate 107, for example a reflector, may be disposed near the light panel and configured to obstruct light emitted from the light panel or reflect light emitted from the light panel back towards the light guide 105.

Turning now to FIG. 17, the large area light panel depicted in FIG. 16 is shown without the optional reflector. Arrows show the relative sensitivity of film designed to turn light into the light guide 105 and toward the light detector (or sensor) 509 from one particular direction.

Turning now to FIG. 18, an embodiment of a light panel is depicted. The light panel includes a light guide 105. Light turning features 2001 can be disposed on a portion of a planar surface on one side to the light guide 105 (e.g., a small portion), and light gathering features 2002 can be disposed on a portion of the opposite planar surface of the light guide 105 (e.g., a small portion). The light turning features 2001 (behind the sensor film) can be modified to indicate where this area is by extracting a light having a certain color or brightness.

Turning now to FIG. 19, an embodiment of a light panel is shown. The light panel includes two light guides 105 separated by a low refractive index (N) layer 2301. Each light guide 105 may have a higher refractive index than the low refractive index layer 2301. A light source 109 may be disposed along one or more edges of one or both of the light guides 105 and a light detector 509 may be disposed along one or more edges of one or both of the light guides 105. Thus, a dual sided panel can be designed with features optimized for light emitting on one surface and light detecting on the other. Some interaction may occur between the light detecting and light emitting features of the light panel depicted in FIG. 16.

However, it may be desirable to limit the interaction of the detecting and light emitting turning features, especially with simple techniques where reciprocal behavior is likely, for example, with printed dots.

The light guide material may comprise a substrate, for example, acrylic, glass, polyethylene terephthalate (PET), or PET-G. In one example, a large area light guide (such as 4×8') may be approximately 0.25" thick. Two such light guides could be bonded together with a lower refractive index isolation later between the two. In this example, light may propagate from TIR within each light guide 105 but light trapped in either light guide by TIR cannot cross into the other light guide 105. Light collected and gathered for detecting will be less subject to scattering by lighting turning features and vice versa. In one embodiment, a low index isolation layer 2301 is a low index adhesive. In other embodiment, light turning features 2001 and light gathering features 2002 do not cover identical areas (e.g., sensing panel where turning features could be limited to a small area, or areas, of a light guide 105). In one example, the materials of each light guide 105 and thicknesses could be different with each light guide 105 having a higher refractive index than the low index isolation layer 2301.

Figures 20, 21:
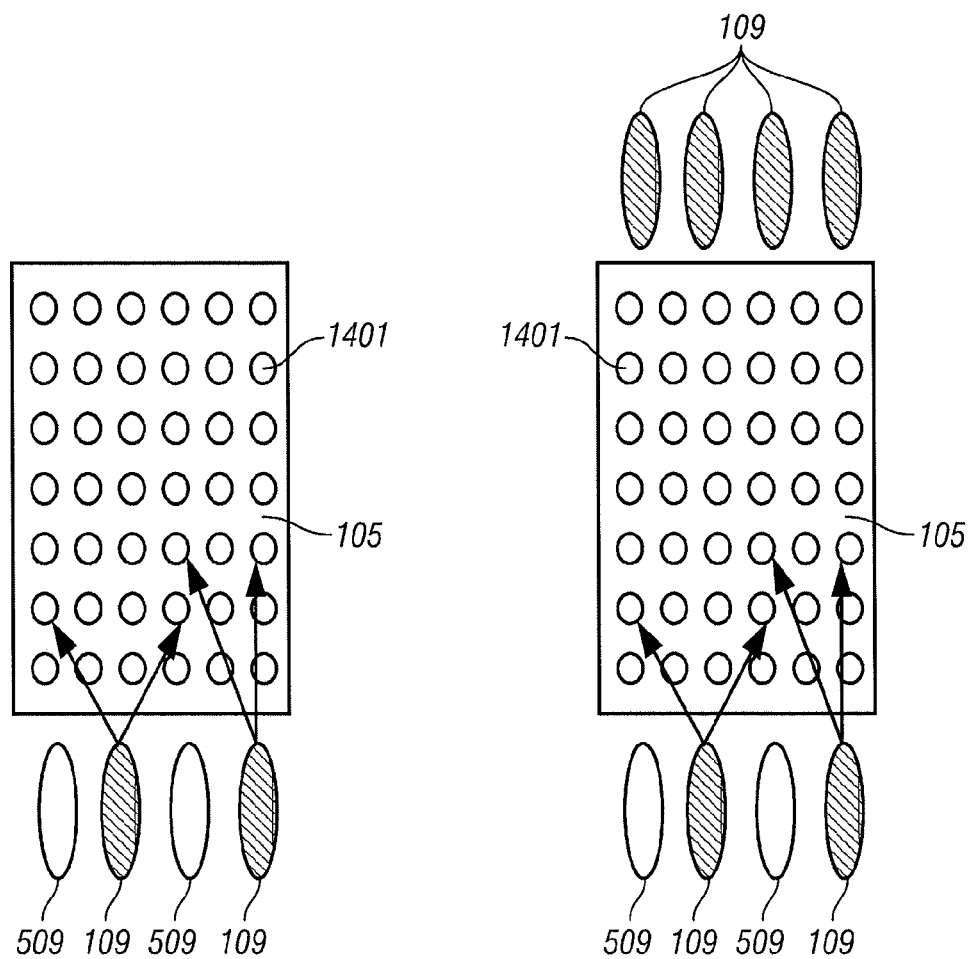
FIG. 20 is a top view schematically illustrating an embodiment of a light panel configured to emit and detect light.
FIG. 21 is a top view schematically illustrating an embodiment of a light panel configured to emit and detect light.

Turning now to FIG. 20, an embodiment of a light panel configured to emit and detect light is shown. The light panel includes a light guide 105 with printed ink dots 1401 printed on one or more surfaces of the light guide 105. Light sensors 109 and light detectors 509 may be disposed along one or more edges of the light guide 105. A light panel, for example, the light panel depicted in FIG. 20, can be used to sense the presence of or variations in ambient radiation (e.g., ambient visible light coming from natural or other illumination sources incident on the light guide 105). In one example, a light panel may be configured to sense natural solar or body heat infra-red waves, or variations in infra-red waves from other sources of heat in a room that may be caused by movement of objects or people (passive infra-red sensing). In another embodiment, a light panel may be designed to emit light in one set of wavelengths while detecting light in another set of wavelengths to avoid swamping the detectors 509 coupled to the same light guide 105 as the light sources 109. Visible or near infra-red wavelength detectors 509 may be made from silicon. Material commonly used in passive infra-red sensing include gallium nitride, caesium nitrate, polyvinyl fluorides, derivatives of phenylprazine, cobalt phthalocyanine, and lithium tantalite. In one example, the panel may be designed to sense light emitted by the panel and reflected back to the light guide. In one example, detectors 509 may be designed with sufficient dynamic range so they are not swamped by light directly coupled from the light sources 109. In another example, detectors 509 may be placed to minimize coupling, or light extraction features designed for minimum direct sensor illumination. The printed dots 1401 may be designed to avoid back scatter of illumination light directly back toward a detector 509. Prismatic features or other light turning features may also be used. The detectors 509 may be placed on the same edge(s) as the light sources 109 so the light cone of the light sources 109 does not directly illuminate the detectors 509.

Turning now to FIG. 21, an embodiment of a light panel configured to emit and detect light is shown. In some examples, ambient light sensing may be desired but detectors 509 may be potentially swamped by light source 109 output. This may be important where the sensing is being used to sense the room lighting state for automatic control of the light (e.g., sensing the onset of darkness).

Figure 22:
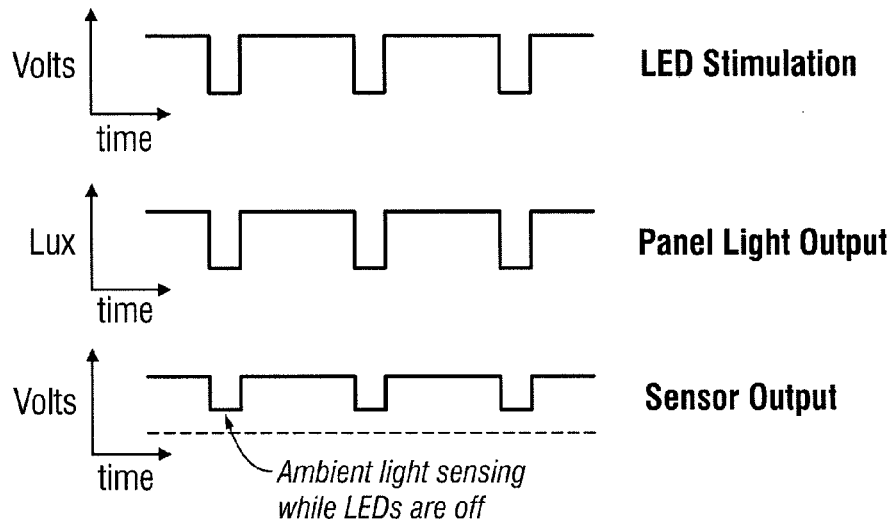
FIG. 22 is a pulse width modulation diagram.

Turning now to FIG. 22, pulse width modulation (PWM) may be used to provide "breaks" in light output that can be used for sensing or detecting light (e.g., with LED light sources which have a steep electrical input to light output response curve). PWM can be used for LED light dimming where a high frequency pulsed light output is integrated by the eye to create the impression of a steady illumination level defined by the LED duty cycle. Pulse repetition rates of greater than approximately 60 Hz or breaks in illumination of about less than 20 ms may not be detectable by the human eye.

Figure 23:
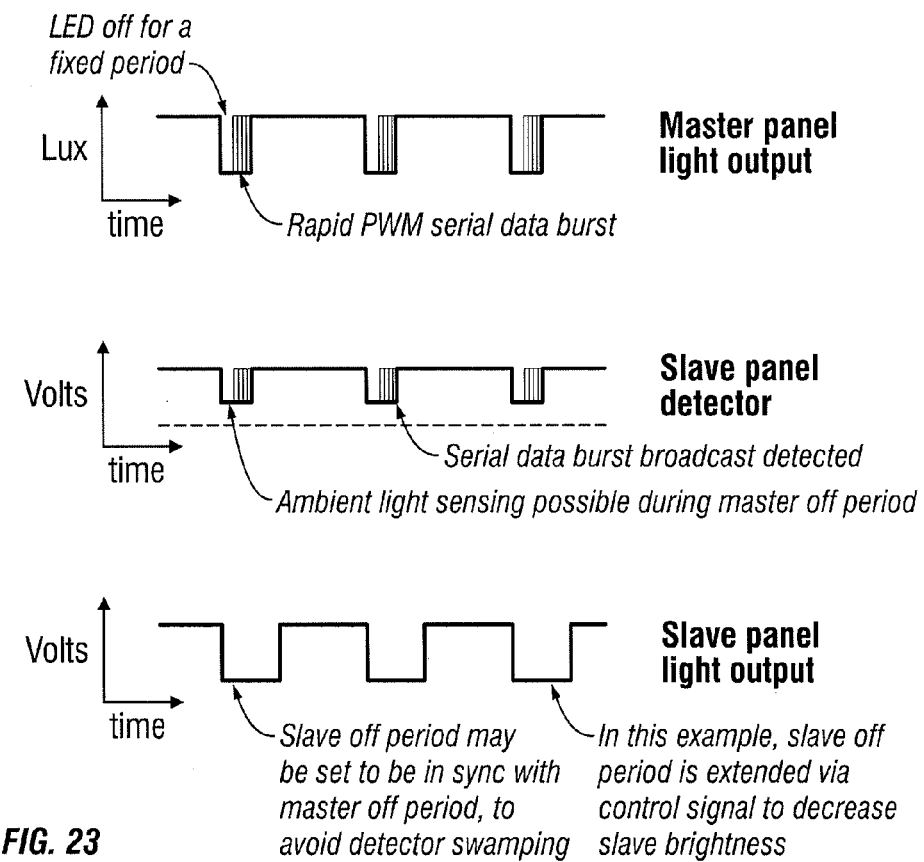
FIG. 23 is a pulse width modulation diagram.

Turning now to FIG. 23, PWM of LED light sources can be used for light dimming, or to provide breaks in light output for ambient light sensing. The same system can be used for the remote control of light panels. The light output of one panel can be PW or amplitude modulated at high frequency (10 s to 1000 s of Hz) which is undetectable by the eye, but detectable by a detector in a light panel to carry control information. Some advantages are daisy chaining of light control without the need for dedicated control circuits, common light source for lighting and remote control is possible (though not essential), and reuse of control sensor for remote control.

In one example, in a room, one panel may be designated as a master and the others as slaves, set to receive some form of serial data from the master, which could be used to set, for example, on/off state, brightness, and color. With an appropriate code, slave devices ("slaves") could also be addressable as groups or individually. In the master/slave control example depicted in FIG. 23, the master can include a periodic PWM data burst in LED output. In one mode, the slave synchronizes an LED off period with the data burst to allow for data (and ambient) sensing. Initial slave signal acquisition is possible by known techniques including: 1) start master first, slaves LEDs initially in off state, until data detected; 2) slave unsynchronized periodic LED off period repetition rate is set to be higher than synchronized rate, so slave will eventually detect and sync to master data bursts. In other examples, asynchronous slave operation is also possible by providing regular slave LED off/sensing periods where the sensor can listen for a random data burst.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A lighting device, comprising:
    a first light guide having a first edge, a second edge opposite to the first edge, a planar first surface extending between the first edge and the second edge, and a planar second surface opposite to the first surface;
    at least one light gathering feature disposed on the first surface and configured to couple light incident on the first surface of the first light guide into the first light guide;
    a first light detector disposed along the first edge of the first light guide and coupled to the first light guide to receive light propagating therein, the first light detector configured to produce a first signal based on an amount of light received from the first light guide through the first edge; and a second light detector disposed along the second edge of the first light guide and coupled to the first light guide to receive light propagating therein, the second light detector configured to produce a second signal based on an amount of light received from the first light guide through the second edge, wherein the first light detector and the second light detector are electrically connected and configured to produce a control signal indicating a direction of movement of an object relative to the first edge and the second edge based at least in part on the first signal and the second signal.

2. The device of claim 1, wherein the at least one light gathering feature comprises at least one of a diffractive feature, a reflective feature, a refractive feature, and a holographic film.

3. The device of claim 1, further comprising a differential amplifier including the first light detector and the second light detector, the differential amplifier having an output terminal, and being configured to provide the control signal to the output terminal for providing to a device electrically connected to the output terminal.

4. The device of claim 1, further comprising:
at least one light source optically coupled to at least one edge of the first light guide; and
at least one light turning feature configured to direct light propagating in the first light guide out of the first light guide.

5. The device of claim 4, wherein the control signal is configured to control at least a portion of the output of the at least one light source.

6. The device of claim 4, wherein the at least one light turning feature comprises a plurality of light turning features disposed on the front surface and the back surface of the first light guide.

7. The device of claim 4, wherein the first and second light detectors are configured to sense IR radiation and the at least one light source comprises a visible light source.

8. The device of claim 4, wherein the first and second light detectors are configured to sense visible light and the at least one light source comprises an IR radiation source.

9. The device of claim 4, wherein the at least first and second light detectors are configured to sense IR radiation and the at least one light source comprises an IR radiation source.

10. The device of claim 4, wherein the first and second light detectors are configured to sense visible light and the at least one light source comprises a visible light source.

11. The device of claim 4, wherein the at least one light turning feature comprises a feature selected from the group consisting of dots, grooves, diffractive gratings, holograms, and prismatic features.

12. The device of claim 4, wherein the at least one light source is configured to emit light having a wavelength within a first range and the first and second light detectors are configured to detect light having a wavelength within a second range.

13. The device of claim 12, wherein the first range and the second range overlap.

14. The device of claim 12, wherein the first range and the second range do not overlap.

15. The device of claim 1, wherein the first and second light detectors comprise a photodiode.

16. The device of claim 1, further comprising:
a second light guide disposed parallel to the first light guide; and
an isolation layer disposed between the first light guide and the second light guide, the isolation layer configured to prevent at least some light propagating in the first light guide from entering the second light guide, and prevent at least some light propagating in the second light guide from entering the first light guide.

17. The device of claim 16, wherein the isolation layer comprises a material having a refractive index lower than the refractive index of the first and second light guide.

18. The device of claim 16, wherein the isolation layer has a refractive index that is between about 1.4 and about 1.6, the first light guide has a refractive index that is between about 1.4 and about 1.6, and the second light guide has a refractive index that is between about 1.4 and about 1.6.

19. The device of claim 16, wherein the isolation layer comprises a material with an index of refraction between about 1.4 and about 1.6.

20. The device of claim 1, wherein the at least one light gathering feature comprises a feature selected from the group consisting of dots, grooves, diffractive gratings, holograms, and prismatic features.

21. A method of manufacturing a lighting device, comprising:
providing a light guide having a first edge, a second edge opposite to the first edge, a planar first surface extending between the first edge and the second edge, and a planar second surface opposite to the first surface;
disposing a first light detector along the first edge of the light guide, the first light detector coupled to the first light guide to receive light propagating therein through the first edge, the first light detector configured to produce a first signal based on an amount of light received from the light guide through the first edge;
disposing a second light detector along the second edge of the light guide, the first light detector coupled to the first light guide to receive light propagating therein through the second edge, the second light detector configured to produce a second signal based on an amount of light received from the light guide through the second edge;
electrically connecting the first light detector and the second light detector, the first and second light detectors being configured to produce a control signal indicating a direction of movement of an object relative to the first edge and the second edge based at least in part on the first signal and the second signal;
forming at least one light gathering feature on at least one of the first surface and the second surface, the at least one light gathering feature configured to direct light incident on the light guide into the light guide;
forming at least one light turning feature on at least one of the first and the second surface, the at least one light turning feature configured to direct light propagating within the light guide away from the light guide; and
disposing at least one light source along one or more edges of the light guide.

22. A lighting device, comprising:
means for guiding light having a first edge and a second edge opposite to the first edge;
first means for detecting light disposed along the first edge of the means for guiding light and coupled to the first means for guiding light to receive light propagating therein, the first means for detecting light configured to produce a first signal based on an amount of light received from the first means for guiding light through the first edge;
second means for detecting light disposed along the second edge of the means for guiding light and coupled to the first means for guiding light to receive light propagating therein, the second means for detecting light configured to produce a second signal based on an amount of light received from the first means for guiding light through the second edge;

means for gathering light disposed on the means for guiding light, the means for gathering light configured to couple light incident on the means for guiding light into the means for guiding light; and means for detecting a direction of movement of an object relative to the first edge and the second edge based at least in part on a variation of incident light across the first means for guiding light between the first edge and the second edge, the detecting means including the first means for detecting light and the second means for detecting light and being configured to produce a control signal indicating the detected direction of movement of the object.

23. The lighting device of claim 22, wherein the means for guiding light comprises a light guide having a planar first surface and a planar second surface.

24. The lighting device of claim 22, wherein the first means for detecting light comprises at least one light detector.

25. The lighting device of claim 22, wherein the means for gathering light comprises one or more light gathering features.

26. The lighting device of claim 22, further comprising:

means for producing light, the means for producing light coupled to the means for guiding light; and means for turning light disposed on the means for guiding light, the means for turning light configured to direct light propagating within the means for guiding light away from the means for guiding light.

27. The lighting device of claim 26, wherein the means for turning light comprises at least one light turning feature.

28. The lighting device of claim 26, wherein the means for producing light comprises at least one light source.

29. A method of sensing a direction of movement of an object across a lighting panel based on the variation of light incident on the lighting panel, the lighting panel having at least a first light detector coupled to a first edge of the lighting panel and a second light detector coupled to a second edge of the lighting panel, the second, edge being opposite to the first edge, the method comprising:

at a first time, receiving light propagating within the lighting panel at the first detector and producing a first signal, the first signal indicating the amount of light detected by the first light detector at the first time, and receiving light propagating within the lighting panel at the second detector and producing a second signal, the second signal indicating the amount of light detected by the second detector at the first time;

at a second time, receiving light propagating within the lighting panel at the first detector and producing a third signal, the third signal indicating the amount of light detected by the first light detector at the second time, and receiving light propagating within the lighting panel at the second detector and producing a fourth signal, the fourth signal indicating the amount of light detected by the second detector at the second time; and determining the direction of the movement of the object relative to the first and second edges based on the first, second, third, and fourth signals.

30. The method of claim 29, further comprising emitting light from the light panel wherein receiving light propagating within the lighting panel at the first time and the second time comprises receiving ambient light that is incident on the lighting panel and light that was emitted from the light panel and reflected back toward the lighting panel.

* * * * *